(12) United States Patent
Komura et al.

(10) Patent No.: US 10,583,798 B2
(45) Date of Patent: Mar. 10, 2020

(54) VEHICLE SEAT WITH SIDE AIRBAGS APPARATUS

(71) Applicant: TOYOTA JIDOSHA KABUSHIKI KAISHA, Aichi-ken (JP)

(72) Inventors: Takamichi Komura, Okazaki (JP); Osamu Fukawatase, Miyoshi (JP); Masato Kunisada, Susono (JP); Hiroe Sugawara, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 172 days.

(21) Appl. No.: 15/714,825

(22) Filed: Sep. 25, 2017

(65) Prior Publication Data

US 2018/0093633 A1 Apr. 5, 2018

(30) Foreign Application Priority Data

Oct. 3, 2016 (JP) .................................. 2016-196008

(51) Int. Cl.
*B60R 21/207* (2006.01)
*B60N 2/68* (2006.01)

(52) U.S. Cl.
CPC .............. *B60R 21/207* (2013.01); *B60N 2/68* (2013.01)

(58) Field of Classification Search
CPC .................................................. B60R 21/207
See application file for complete search history.

(56) References Cited

U.S. PATENT DOCUMENTS

| 8,662,531 | B2 | 3/2014 | Tracht | |
|---|---|---|---|---|
| 8,939,464 | B2 | 1/2015 | Acker et al. | |
| 2005/0116446 | A1* | 6/2005 | Mabuchi | B60R 21/207 280/728.2 |
| 2006/0255572 | A1 | 11/2006 | Svenbrandt et al. | |
| 2011/0057487 | A1 | 3/2011 | Suzuki | |
| 2015/0137493 | A1* | 5/2015 | Fujiwara | B60R 21/233 280/729 |
| 2015/0158453 | A1* | 6/2015 | Fujiwara | B60R 21/207 280/730.2 |

(Continued)

FOREIGN PATENT DOCUMENTS

CN 1618666 A 5/2005
CN 102009607 A 4/2011
(Continued)

*Primary Examiner* — Ruth Ilan
(74) *Attorney, Agent, or Firm* — Hauptman Ham, LLP

(57) ABSTRACT

In a vehicle seat, a gas generating device of a side airbag apparatus is attached to the inside of an outer side frame in a seat-width direction. When a seated occupant is a three-dimensional mannequin of AM50, a portion of the gas generating device overlaps a back pan of the three-dimensional mannequin as viewed in a seat front-rear direction. Here, in a plan section of a seat back in a range in which the gas generating device is positioned in a seat up-down direction, when an imaginary line overlapping a section of the back pan is moved back toward a seat rear side until the imaginary line comes into contact with a side spring portion of a seat back spring, the gas generating device is positioned rearward of a moved-back imaginary line in the seat front-rear direction and outward of the moved-back imaginary line in the seat-width direction.

18 Claims, 5 Drawing Sheets

(56) References Cited

U.S. PATENT DOCUMENTS

| | | |
|---|---|---|
| 2015/0246627 A1 | 9/2015 | Shimizu |
| 2016/0257276 A1* | 9/2016 | Line .......................... B60N 2/68 |
| 2017/0101072 A1* | 4/2017 | Shiga ................... B60R 21/207 |

FOREIGN PATENT DOCUMENTS

| | | | |
|---|---|---|---|
| CN | 104718106 A | | 6/2015 |
| EP | 2567870 A1 | * | 3/2013 |
| GB | 2397047 A | | 7/2004 |
| JP | 11-020594 A | | 1/1999 |
| JP | 2006-513083 A | | 4/2006 |
| JP | 2011-56979 A | | 3/2011 |
| JP | 2014-080169 A | | 5/2014 |
| WO | 2014/054553 A1 | | 8/2016 |

\* cited by examiner

VEHICLE SEAT WITH SIDE AIRBAGS APPARATUS

INCORPORATION BY REFERENCE

The disclosure of Japanese Patent Application No. 2016-196008 filed on Oct. 3, 2016 including the specification, drawings and abstract is incorporated herein by reference in its entirety.

BACKGROUND

1. Technical Field

The present disclosure relates to a vehicle seat with a side airbag apparatus.

2. Description of Related Art

In a vehicle seat with a side airbag apparatus described in Japanese Unexamined Patent Application Publication No. 2014-080169 (JP 2014-080169 A), an airbag module including a side airbag having a forward deployment airbag and an inward inflation airbag and an inflator is disposed inward of a side frame of a seat back in a seat-width direction.

Similarly, in a seat back described in U.S. Pat. No. 8,939,464, an airbag module including an airbag (side airbag) and an inflator is disposed inward of a seat back frame (side frame) of a seat back in a seat-width direction.

SUMMARY

As described above, in the configuration in which the airbag module is disposed inward of the side frame in the seat-width direction, compared to a configuration in which the airbag module is disposed outward of the side frame in the seat-width direction, the distance between the airbag module and a seated occupant is short. Moreover, during inflation and deployment of the side airbag, the seated occupant receives a reaction force from the side frame at an early stage. Accordingly, it is possible to restrain the seated occupant at the time of a side collision at an early stage.

However, for example, in a vehicle seat with a seat back having a small width dimension, when an inflator (gas generating device) is disposed inward of a side frame in a seat-width direction, there may be cases where the gas generating device and the torso of a seated occupant overlap as viewed in a seat front-rear direction. In the configuration, when the seated occupant moves relative to the seat back toward a seat rear side due to an impact caused by a rear collision of the vehicle, there is a possibility that the torso of the seated occupant may interfere with the gas generating device in the seat front-rear direction (abut the gas generating device via a seat back pad or the like).

The disclosure provides a vehicle seat with a side airbag apparatus capable of preventing or suppressing the torso of a seated occupant from interfering with a gas generating device in a seat front-rear direction at the time of a rear collision of a vehicle even in a case where the gas generating device and the torso of the seated occupant overlap as viewed in the seat front-rear direction.

A first aspect of the disclosure relates to a vehicle seat with a side airbag apparatus, including: a seat back frame including right and left side frames, an upper frame, and a lower frame; a seat back spring that is disposed between the right and left side frames, includes a wire member including right and left side spring portions bridged between the upper frame and the lower frame and a plate member attached to the wire member, and supports a seat back pad from a seat rear side; a side airbag; and a gas generating device that is attached to an inside of one of the right and left side frames in a seat-width direction and is configured to supply inflation gas to the side airbag. In a case where a seated occupant is a three-dimensional mannequin of a world side impact dummy AM50, the gas generating device is disposed such that a portion of the gas generating device overlaps a back pan of the three-dimensional mannequin as viewed in a seat front-rear direction, and in a plan section of a seat back in a range in which the gas generating device is positioned in a seat up-down direction, in a case where an imaginary line overlapping a section of the back pan is moved back toward the seat rear side until the imaginary line comes into contact with the right and left side spring portions, the gas generating device is attached to be rearward of a moved-back imaginary line in the seat front-rear direction and outward of the moved-back imaginary line in the seat-width direction.

The three-dimensional mannequin described above is an SAE 3DM specified in SAE J826 in the SAE standard of the United States.

According to the first aspect, the gas generating device that supplies the inflation gas to the side airbag is attached to the inside of one of the right and left side frames included in the seat back frame in the seat-width direction. The gas generating device is disposed such that the portion of the gas generating device overlaps the back pan of the three-dimensional mannequin as viewed in a seat front-rear direction in the case where the seated occupant is the three-dimensional mannequin of the AM50. That is, in a case where the seated occupant has the same physique as the AM50, a portion of the gas generating device overlaps the torso of the seated occupant as viewed in the seat front-rear direction.

Here, in the plan section of the seat back in the range in which the gas generating device is positioned in the seat up-down direction, in a case where the imaginary line overlapping the section of the back pan is moved back toward the seat rear side until the imaginary line comes into contact with the right and left side spring portions of the seat back spring, the gas generating device is positioned rearward of the moved-back imaginary line in the seat front-rear direction and outward of the moved-back imaginary line in the seat-width direction. Accordingly, when the torso of the seated occupant having the same physique as the AM50 moves relative to the seat back toward the seat rear side while compressing the seat back pad at the time of a rear collision of the vehicle and the relative movement is restrained by the right and left side spring portions of the seat back spring, the gas generating device is positioned rearward of the torso of the seated occupant in the seat front-rear direction and outward of the torso of the seated occupant in the seat-width direction. Therefore, according to the first aspect, it is possible to prevent or suppress the torso of the seated occupant from interfering with the gas generating device in the seat front-rear direction.

In the vehicle seat according to the first aspect, the gas generating device may be stored in the side airbag. The side airbag may be stored in the seat back in a state in which the side airbag straddles the one side frame from a seat front side in the seat-width direction and a portion of the side airbag positioned outward of the one side frame in the seat-width direction is folded.

In the vehicle seat according to the first aspect, the gas generating device attached to the inside of one of the right and left side frames included in the seat back frame in the seat-width direction is stored in the side airbag. The side airbag is stored in the seat back in a state in which the side airbag straddles the one side frame from the seat front side in the seat-width direction and the portion of the side airbag positioned outward of the one side frame in the seat-width direction is folded. That is, since a portion of the side airbag is folded on the outside of the one side frame in the seat-width direction, it is possible to prevent or suppress the torso of the seated occupant moving relative to the seat back toward the seat rear side at the time of a rear collision of the vehicle from interfering with the side airbag in the stored state in the seat front-rear direction.

In the vehicle seat according to the first aspect, the gas generating device may include a cylinder type inflator disposed such that an axial direction of the inflator is aligned with an up-down direction of the seat back, and a retainer that is formed in a rectangular tube shape in which an axial direction of the retainer is aligned with the up-down direction of the seat back, has the inflator inserted into the retainer, and has a corner R set in a corner section on a seat front side and on the inside in the seat-width direction.

In the vehicle seat according to the first aspect, the retainer having a rectangular tube shape included in the gas generating device has the corner R set in the corner section on the seat front side and on the inside in the seat-width direction (that is, on the seated occupant side). Accordingly, compared to a case where the corner R is not set in the corner section, the corner section is disposed to be moved back toward the seat rear side and the outside in the seat-width direction. Therefore, it is possible to more effectively prevent or suppress the torso of the seated occupant moving relative to the seat back toward the seat rear side at the time of a rear collision of the vehicle from interfering with the retainer (the gas generating device) in the seat front-rear direction.

A second aspect of the disclosure relates to a vehicle seat with a side airbag apparatus including: a seat back frame including right and left side frames; a seat back spring that is disposed between the right and left side frames, is supported by the seat back frame, and supports a seat back pad from a seat rear side; a side airbag; and a gas generating device that is attached to an inside of one of the right and left side frames in a seat-width direction and is configured to supply inflation gas to the side airbag. In a case where a seated occupant is a three-dimensional mannequin of a world side impact dummy AM50, the gas generating device is disposed such that a portion of the gas generating device overlaps a back pan of the three-dimensional mannequin as viewed in a seat front-rear direction, and in a plan section of a seat back in a range in which the gas generating device is positioned in a seat up-down direction, in a case where an imaginary line overlapping a section of the back pan is moved back toward the seat rear side until the imaginary line comes into contact with the seat back spring, the gas generating device is attached to be rearward of the moved-back imaginary line in the seat front-rear direction and outward of the moved-back imaginary line in the seat-width direction.

In the vehicle seat according to the second aspect, the gas generating device that supplies the inflation gas to the side airbag is attached to the inside of one of the right and left side frames included in the seat back frame in the seat-width direction. The gas generating device is disposed such that the portion of the gas generating device overlaps the back pan of the three-dimensional mannequin as viewed in a seat front-rear direction in the case where the seated occupant is the three-dimensional mannequin of the AM50. That is, in a case where the seated occupant has the same physique as the AM50, a portion of the gas generating device overlaps the torso of the seated occupant as viewed in the seat front-rear direction.

Here, in the plan section of the seat back in the range in which the gas generating device is positioned in the seat up-down direction, in a case where the imaginary line overlapping the section of the back pan is moved back toward the seat rear side until the imaginary line comes into contact with the seat back spring, the gas generating device is positioned rearward of the moved-back imaginary line in the seat front-rear direction and outward of the moved-back imaginary line in the seat-width direction. Accordingly, when the torso of the seated occupant having the same physique as the AM50 moves relative to the seat back toward the seat rear side while compressing the seat back pad at the time of a rear collision of the vehicle and the relative movement is restrained by the seat back spring, the gas generating device is positioned rearward of the torso of the seated occupant in the seat front-rear direction and outward of the torso of the seated occupant in the seat-width direction. Therefore, according to the second aspect, it is possible to prevent or suppress the torso of the seated occupant from interfering with the gas generating device in the seat front-rear direction.

As described above, in the vehicle seat with a side airbag apparatus, it is possible to prevent or suppress the torso of the seated occupant from interfering with the gas generating device in the seat front-rear direction at the time of a rear collision of the vehicle even in a case where the gas generating device and the torso of the seated occupant overlap as viewed in the seat front-rear direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
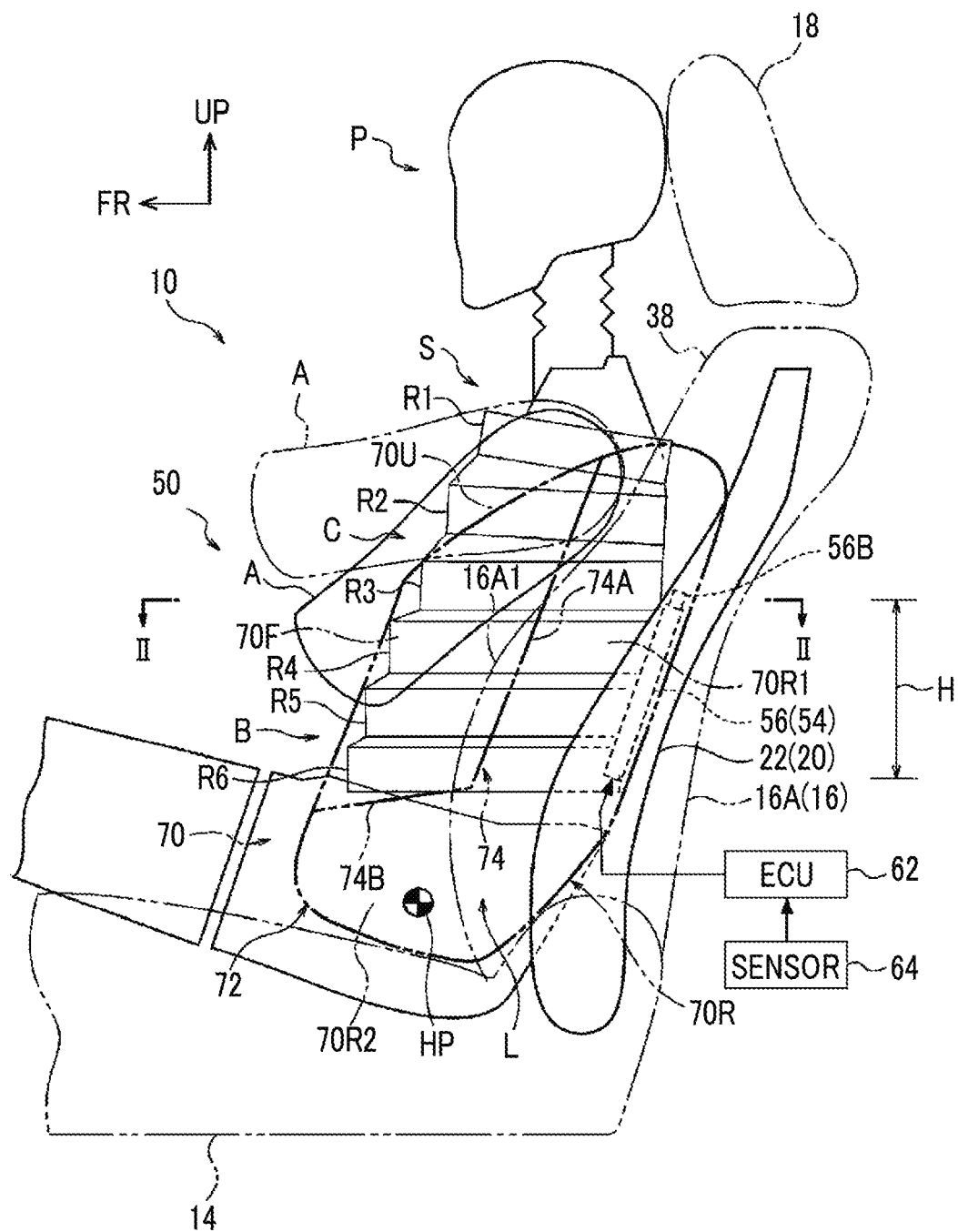
FIG. 1 is a schematic side view illustrating a state in which inflation and deployment of a side airbag is completed in a vehicle seat provided with a side airbag apparatus according to an embodiment of the disclosure.

Hereinafter, a vehicle seat 10 with a side airbag apparatus mounted therein (hereinafter, abbreviated to a vehicle seat 10) according to an embodiment of the disclosure will be described with reference to FIGS. 1 to 5. Arrows FR, UP, OUT, which are appropriately described in each drawing, respectively indicate a forward direction (advancing direction), an upward direction, and an outward direction in a width direction of a vehicle. Hereinafter, in a case where descriptions are provided simply using a front-rear direction, a right-left direction, and an up-down direction, unless otherwise specified, the front-rear direction, the right-left direction, and the up-down direction respectively indicate forward and rearward in a vehicle front-rear direction, rightward and leftward in a vehicle right-left direction (vehicle-width direction), and upward and downward in a vehicle up-down direction. In each drawing, there may be cases where some reference numerals are omitted from the viewpoint of ease of viewing of the drawings.

Overall Configuration of Vehicle Seat 10

First, the outline of the schematic configuration of the vehicle seat 10 will be described, and thereafter the configuration of a side airbag apparatus 50, which is a main part of the embodiment, will be described. As illustrated in FIG. 1, the vehicle seat 10 includes a seat cushion 14, a seat back 16 reclinably connected to the rear end portion of the seat cushion 14, and a headrest 18 connected to the upper end portion of the seat back 16. In the vehicle seat 10, the side airbag apparatus 50 is mounted in a side portion (side support portion) 16A on the outside of the seat back 16 in the vehicle-width direction. The vehicle seat 10 is, for example, the driver's seat of a left-hand drive vehicle or the passenger seat of a right-hand drive vehicle, and is disposed on the left side in the vehicle cabin. A front-rear direction, a right-left direction (width direction), and an up-down direction of the vehicle seat 10 coincide with the vehicle front-rear direction, the vehicle right-left direction (width direction), and the vehicle up-down direction. In a case where the vehicle seat 10 is disposed on the right side in the vehicle cabin, the vehicle seat 10 has a configuration symmetrical to that of the embodiment.

Figure 2:
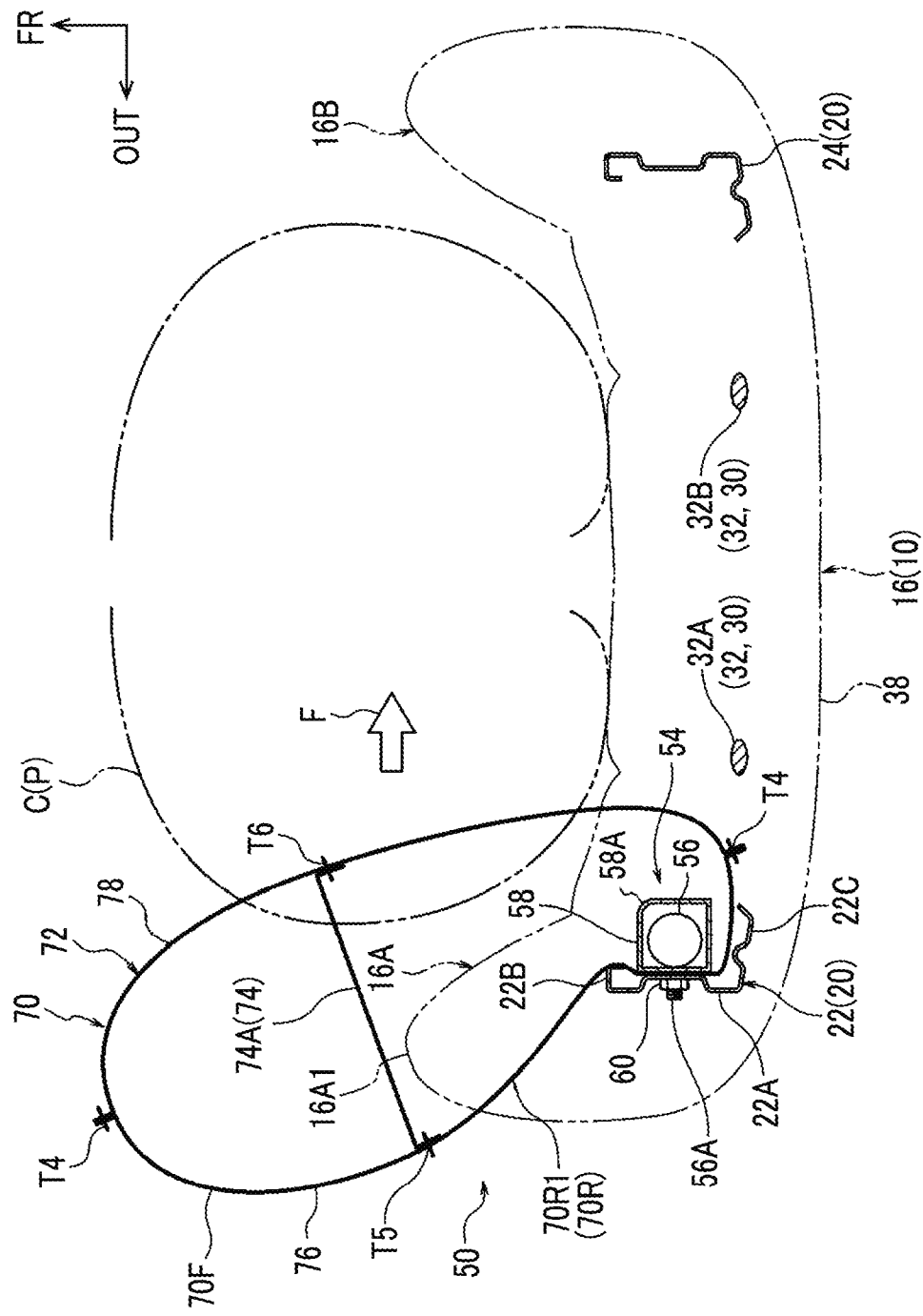
FIG. 2 is an enlarged sectional view illustrating a cut section taken along the line II-II of FIG. 1, and is a view illustrating a plan section of a seat back in a range in which a gas generating device is positioned in a seat up-down direction.

In FIG. 1, a dummy P for a collision test is seated on the vehicle seat 10 instead of an actual occupant. In FIG. 2, the chest C of the dummy P is schematically illustrated by a two-dot chain line. The dummy P is the AM50 (the 50th percentile American male) of the World Side Impact Dummy (World SID). The dummy P is seated on the vehicle seat 10 by a seating method specified in a side collision test method. The forward and rear positions of the seat back 16 with respect to the vehicle and the inclination angle of the seat back 16 with respect to the seat cushion 14 are adjusted reference setting positions corresponding to the above-mentioned seating method.

Six ribs R1, R2, R3, R4, R5, and R6 are provided on the torso of the dummy P. There may be cases where the ribs R1, R2, R3, R4, R5, and R6 are referred to as a "shoulder rib R1", an "upper chest rib R2", a "middle chest rib R3", a "lower chest rib R4", an "upper abdomen rib R5", and a "lower abdomen rib R6" in order from the top. The shoulder rib R1 is provided on a shoulder S of the dummy P. The upper chest rib R2, the middle chest rib R3, and the lower chest rib R4 are provided on a chest C of the dummy P. The upper abdomen rib R5 and the lower abdomen rib R6 are provided on an abdomen B of the dummy P. Hereinafter, there may be cases where the dummy P is referred to as a "seated occupant P".

Figure 3:
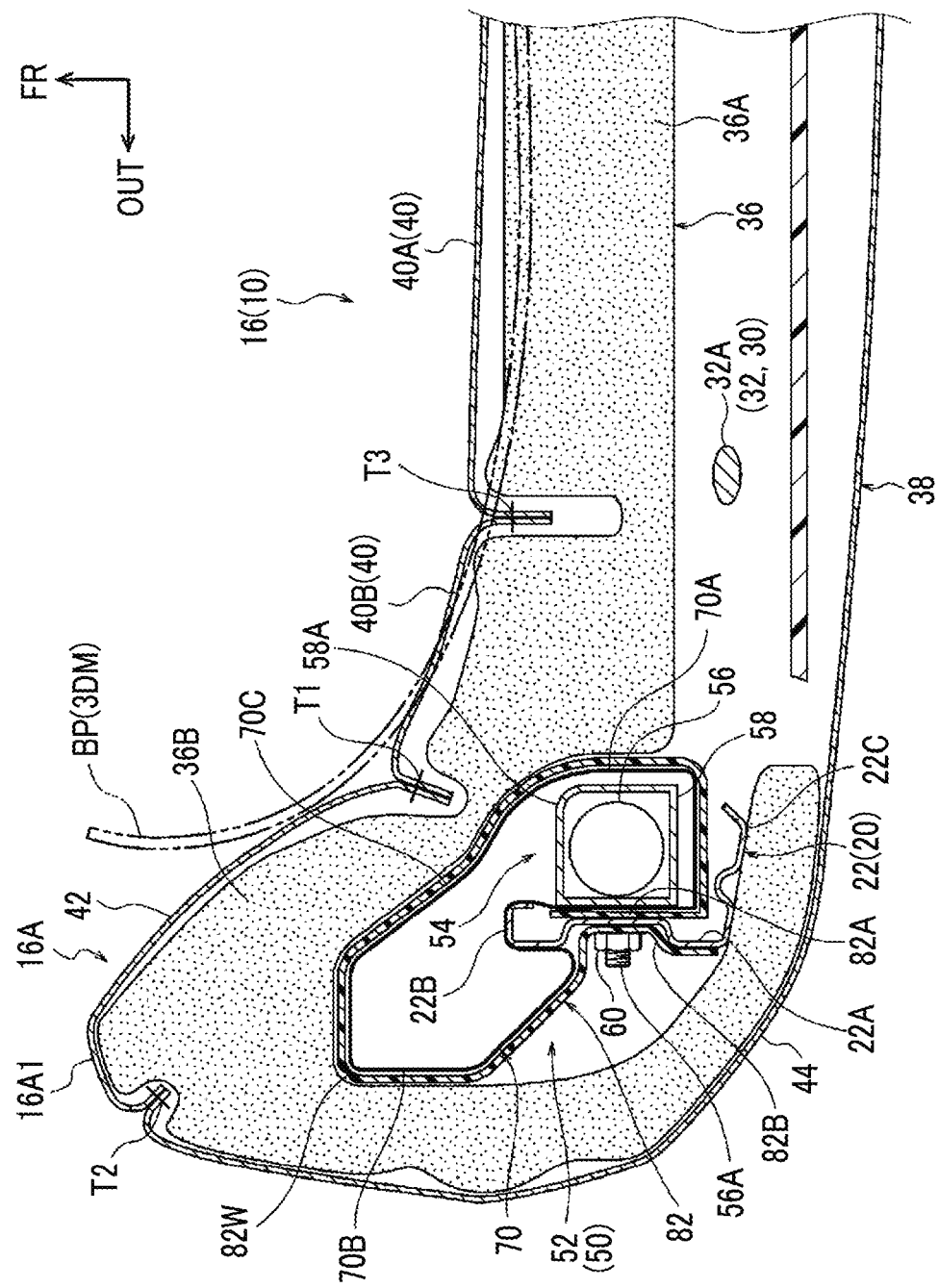
FIG. 3 is an enlarged plan sectional view illustrating a part of the seat back of FIG. 2, and is a view illustrating a stored state of the side airbag.

In addition, in FIG. 3, a back pan BP of a three-dimensional mannequin (hip-point mannequin) 3DM of the AM50 is indicated by a two-dot chain line representing the outer shape (outline) of the section of the back pan BP. The three-dimensional mannequin 3DM is an SAE 3DM specified in SAE J826 in the SAE standard of the United States.

As illustrated in FIGS. 1 to 4, the seat back 16 of the vehicle seat 10 includes a seat back frame 20, a seat back spring 30 attached to the seat back frame 20, a seat back pad 36 (not illustrated in the figures other than FIGS. 3 and 5) covering the seat back frame 20, and a seat back skin 38 (not illustrated in FIG. 4) covering the seat back pad 36.

Figure 4:
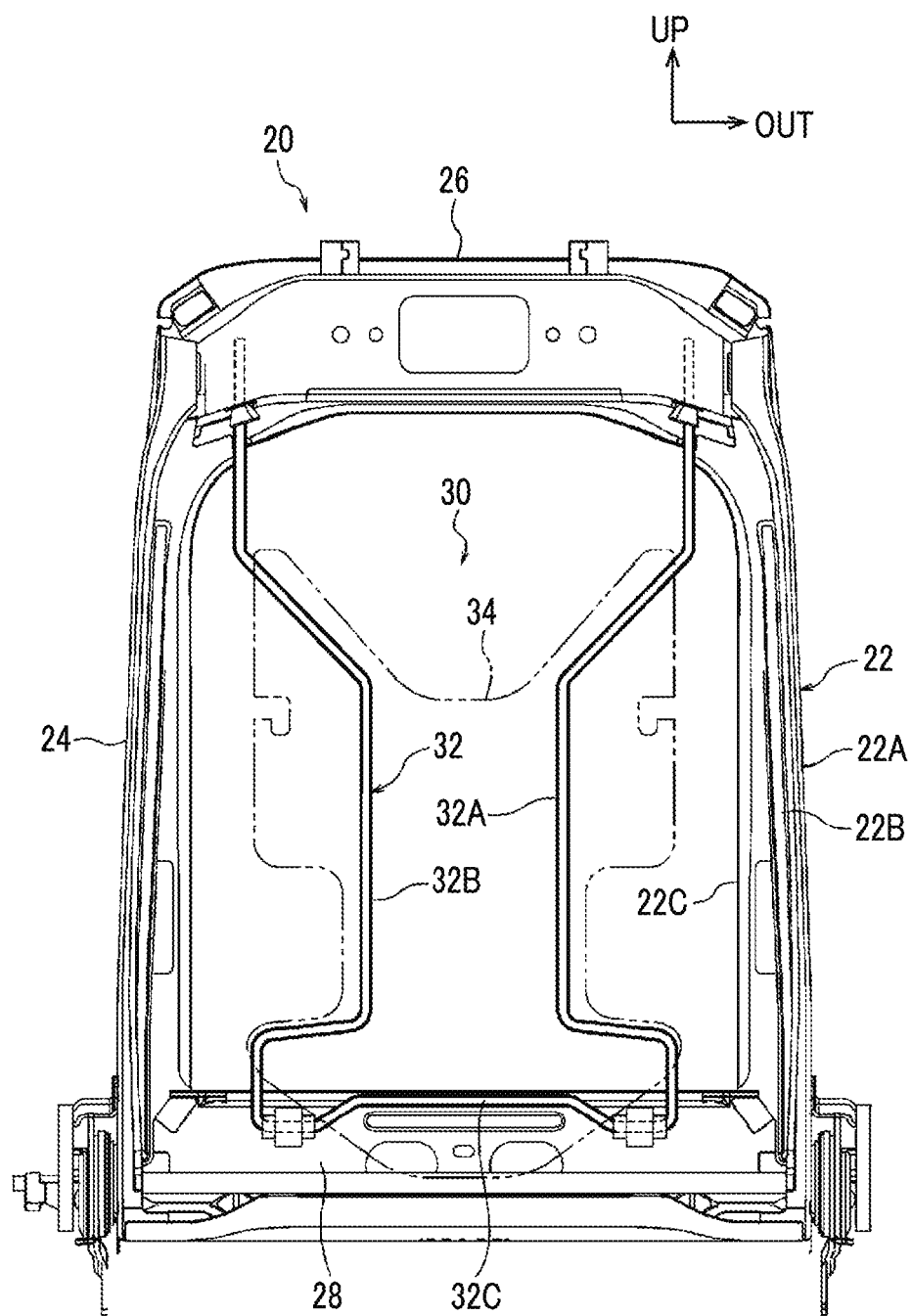
FIG. 4 is a front view illustrating a seat back frame to which a seat back spring is attached.

The seat back frame 20 is formed of metal, for example, and forms the frame of the seat back 16. As illustrated in FIGS. 2 and 4, the seat back frame 20 includes an outer side frame 22 and an inner side frame 24 as right and left side frames. The outer side frame 22 extends in the up-down direction of the seat back 16 in the side portion 16A on the outside of the seat back 16 in the vehicle-width direction. The inner side frame 24 extends in the up-down direction of the seat back 16 in a side portion (side support portion) 16B on the center side of the seat back 16 in the vehicle-width direction. Furthermore, as illustrated in FIG. 4, the seat back frame 20 includes an upper frame 26 which connects the upper end portions of the outer side frame 22 and the inner side frame 24 in the vehicle-width direction, and a lower frame 28 which connects the lower end portions of the outer side frame 22 and the inner side frame 24 in the vehicle-width direction. The outer side frame 22 corresponds to "one side frame" in the embodiment of the disclosure. In the following description, the side portion 16A is referred to as an "outer side portion 16A".

As illustrated in FIG. 3, the outer side frame 22 includes a side wall portion 22A extending in the vehicle front-rear direction in a plan sectional view of the seat back 16, a front flange portion 22B extending from the front end of the side wall portion 22A toward the center side in the vehicle-width direction (toward the inside in a seat-width direction), and a rear flange portion 22C extending from the rear end of the side wall portion 22A toward the center side in the vehicle-width direction. The rear flange portion 22C is set to have larger dimensions in the vehicle-width direction than those of the front flange portion 22B, and the outer side frame 22 has a substantially L-shape in the plan sectional view of the seat back 16. A rib protruding inward in the seat-width direction is formed at the center portion of the side wall portion 22A in the vehicle front-rear direction, and a rib protruding toward a seat front side is formed at the center portion of the rear flange portion 22C in the seat-width direction. The outer side frame 22 is disposed such that a portion of the rear flange portion 22C (a portion on the center side in the vehicle-width direction) overlaps the back pan BP of the three-dimensional mannequin 3DM as viewed in the seat front-rear direction and the gap between the outer side frame 22 and the seated occupant P is set to be narrow. The inner side frame 24 has the same configuration except that the inner side frame 24 is formed in a shape symmetrical to the outer side frame 22.

The seat back spring 30 illustrated in FIGS. 2 to 4 is disposed between the outer side frame 22 and the inner side frame 24 and is constituted by a wire member 32 attached to the seat back frame 20, and a plate member 34 attached to the wire member 32. For example, the wire member 32 is formed by bending a metal wire rod and is bridged between the upper frame 26 and the lower frame 28. The wire member 32 is constituted by a pair of right and left side spring portions 32B, 32A extending in the up-down direction of the seat back 16 and a lower spring portion 32C which connects the lower end portions of the right and left side spring portions 32B, 32A in the seat-width direction. Both end portions of the lower spring portion 32C in the seat-width direction are fixed to the lower frame 28, and the upper end portions of the right and left side spring portions 32B, 32A are fixed to the upper frame 26 so that the right and left side spring portions 32B, 32A are bridged between the upper frame 26 and the lower frame 28. The center portions of the right and left side spring portions 32B, 32A in the vehicle up-down direction is bent into convex shapes toward the inside in the seat-width direction (the center side in the seat-width direction). For example, the plate member 34 is formed by press-forming a sheet metal, and the plate member 34 is attached to the seat front side of the wire member 32 in a posture in which a plate thickness direction is aligned with the front-rear direction of the seat back 16.

The seat back pad 36 illustrated in FIG. 3 is formed of a foamed body such as urethane foam and forms the cushioning material of the seat back 16. The seat back pad 36 includes a pad center portion 36A and a pair of right and left pad side portions 36B (the pad side portions 36B on the center side in the vehicle-width direction is not illustrated) provided on both the right and left sides of the pad center portion 36A. The pad center portion 36A is disposed on the center side of the seat back 16 in the width direction, and is supported on a seat rear side by the seat back spring 30. The right and left pad side portions 36B are formed in a substantially C-shape open to the inside in the seat-width direction and accommodate the outer side frame 22 and the inner side frame 24 therein. The pad side portion 36B protrudes toward the seat front side relative to the pad center portion 36A and has a shape that ensures side support properties for the seated occupant P.

The seat back skin 38 illustrated in FIG. 3 is formed of, for example, cloth, leather, or synthetic leather and forms the skin of the seat back 16. The seat back skin 38 has a front skin 40 covering the pad center portion 36A from the seat front side, a front side skin 42 covering the pad side portion 36B from the seat front side, and a rear side skin 44 which covers the pad side portion 36B from the outside in the seat-width direction and the seat rear side and covers the pad center portion 36A from the seat rear side. The front side skin 42 is sewn to the front skin 40 at a sewn portion T1 and is sewn to the rear side skin 44 at a sewn portion T2. The sewn portion T2 of the front side skin 42 and the rear side skin 44 is positioned in the vicinity of a front edge portion 16A1 (so-called "stile portion") of the outer side portion 16A. The sewn portion T2 is configured to tear open along with the pad side portion 36B when the side airbag 70, which will be described later, inflates and deploys. In the embodiment, the front skin 40 is configured such that skin pieces 40A, 40B are sewn to each other at a sewn portion T3 positioned closer to the inside in the seat-width direction than the sewn portion T1.

Configuration of Side Airbag Apparatus 50

As illustrated in FIGS. 1 to 3 and 5, the side airbag apparatus 50 includes a single gas generating device 54 (not illustrated in FIG. 4) mounted on the inside of the outer side frame 22 in the seat-width direction, and a single side airbag 70 which receives inflation gas from the gas generating device 54 to inflate and deploy. The gas generating device 54 and the side airbag 70 normally act as an airbag module 52 illustrated in FIGS. 3 and 5, and are stored in the outer side portion 16A. The airbag module 52 is configured to include an enclosing member 82 illustrated in FIGS. 3 and 5 (not illustrated in the figures other than FIGS. 3 and 5).

The gas generating device 54 is constituted by a single inflator 56 and a single retainer 58 (not illustrated in FIG. 1). The inflator 56 and the retainer 58 are disposed inward of the side wall portion 22A of the outer side frame 22 in the seat-width direction and forward of the rear flange portion 22C in the seat front-rear direction. The inflator 56 is a cylinder type inflator, and is formed in a cylindrical shape. The inflator 56 is disposed in a posture in which the axial direction (longitudinal direction) of the inflator 56 is aligned with the up-down direction of the seat back 16. A range H (see FIG. 1) in which the inflator 56 is disposed in the vehicle up-down direction is set to a range in which the height measured from a hip-point HP of the seated occupant P is 150 mm to 300 mm.

The retainer 58 is a member also called a diffuser, and is formed of metal in a rectangular tube shape. The retainer 58 is disposed in a posture in which the axial direction of the retainer 58 is aligned with the up-down direction of the seat back 16, and the inflator 56 is inserted into the retainer 58. The retainer 58 has a function of rectifying gas generated from the inflator 56. In the retainer 58, a corner R is set in a corner section 58A on the seat front side and on the inside in the seat-width direction. The corner section 58A is formed in an arc shape which is convex toward the seat front side and the inside in the seat-width direction in the plan sectional view of the seat back 16, and is located closer to the center (axis) side of the retainer 58 than the other three corner sections of the retainer 58.

A pair of upper and lower stud bolts 56A (see FIGS. 2, 3, and 5) protrudes from the outer peripheral portion of the inflator 56 toward the outside in the seat-width direction (outside in the vehicle-width direction). The stud bolt 56A penetrates through the retainer 58 and the side wall portion 22A and a nut 60 is screwed to the tip end side of each of the stud bolts 56A. Accordingly, the inflator 56 is fastened and fixed (so-called side-fastened) to the outer side frame 22 together with the retainer 58. The upper and lower stud bolts 56A are not limited to the configuration in which the upper and lower stud bolts 56A are provided in the inflator 56, and a configuration in which the upper and lower stud bolts 56A are provided in the retainer 58 may also be employed. In this case, for example, the inflator 56 is fixed to the retainer 58 by means of crimping or the like. The gas generating device 54 having the above-described configuration is disposed such that a portion of the gas generating device 54 overlaps the back pan BP of the above-described three-dimensional mannequin 3DM as viewed in the seat front-rear direction. In addition, a gap having a dimension of, for example, about 10 mm in the vehicle front-rear direction is set between the retainer 58 and the rear flange portion 22C such that assembly of the airbag module 52 into the outer side frame 22 is facilitated.

A gas ejecting portion 56B is provided at the upper end portion or the lower end portion (here, the upper end portion) of the inflator 56. The gas ejecting portion 56B is disposed at a height equal to the chest C of the seated occupant P. A plurality of gas ejecting ports (not illustrated) arranged in the peripheral direction of the inflator 56 is formed in the gas ejecting portion 56B. When the inflator 56 is activated (operated), gas is radially ejected from the plurality of gas ejecting ports. As illustrated in FIG. 1, a side collision ECU 62 mounted in the vehicle is electrically connected to the inflator 56. A side collision sensor 64 for detecting a side collision is electrically connected to the side collision ECU 62. The side collision ECU 62 is configured to activate the inflator 56 when a side collision is detected based on the output of the side collision sensor 64. For example, the side collision sensor 64 is configured to include a pressure sensor or an acceleration sensor (in-door sensor) disposed in the front side door or the rear side door, and an acceleration sensor (a sensor in the pillar) disposed in the B pillar.

In a case where a collision prediction sensor (pre-crash sensor) for predicting a side collision is electrically connected to the side collision ECU 62, the inflator 56 may be configured to be activated when the side collision ECU 62 predicts a side collision based on the signal from the collision prediction sensor. As the collision prediction sensor, for example, at least one of a millimeter-wave radar, a stereo camera, and an infrared laser capable of monitoring the front and sides of the vehicle can be applied.

On the other hand, as illustrated in FIGS. 1 and 2, the side airbag 70 is a so-called front-rear two-chamber side airbag and has a configuration in which a single bag body 72 is partitioned into a front chamber 70F and a rear chamber 70R by a tether 74 (partition wall; partition cloth) as a partition portion. For example, two sheets of base cloth 76, 78 (see FIG. 2; reference numerals are omitted in the other figures) formed by cutting a nylon-based or polyester-based cloth material are overlapped with each other and the outer peripheral portions of the base cloth 76, 78 are sewn to each other at sewn portions T4 (see FIG. 2; reference numerals are omitted in the other figures) such that the bag body 72 is formed in an elongated bag shape.

A method of manufacturing the bag body 72 is not limited to the above description and can be appropriately changed. For example, a configuration in which the bag body 72 is manufactured by folding a single sheet of base fabric into two and sewing the outer peripheral portions may be employed. In addition, for example, a configuration in which the bag body 72 is manufactured by a hollow weaving method (so-called OPW method) using an automatic loom may be employed. In the following description, the front-rear and up-down directions described regarding the side airbag 70 indicate the directions in a state in which inflation and deployment of the side airbag 70 is completed, and substantially coincide with the front-rear and up-down directions of the seat back 16.

For example, the tether 74 is formed by cutting the same cloth material as the base cloth 76, 78 of the side airbag 70 into a long band shape. As illustrated in FIG. 2, in the tether 74, one long edge end portion is sewn to one base cloth 76 at a sewn portion T5 and the other long edge end portion is sewn to the other base cloth 78 at a sewn portion T6. The tether 74 is constituted by a front-rear partition portion 74A and an up-down partition portion 74B (see FIG. 1), and is formed into a substantially L-shape in a case where the inflated and deployed state of the side airbag 70 is viewed in the vehicle-width direction.

Specifically, the front-rear partition portion 74A extends from the upper edge portion of the side airbag 70 in the center portion in the front-rear direction of the side airbag 70 toward the lower portion of the side airbag 70, and extends in the up-down direction of the side airbag 70. The up-down partition portion 74B extends from the lower end of the front-rear partition portion 74A toward the front edge portion of the side airbag 70, and the front end portion of the up-down partition portion 74B reaches the front edge portion of the side airbag 70. A plurality of (here, three) communication ports (not illustrated) is formed in the front-rear partition portion 74A of the tether 74 so as to be arranged in the up-down direction of the side airbag 70, and the front chamber 70F and the rear chamber 70R communicate with each other via the communication ports. The number of communication ports is not limited to three and can be appropriately changed. Further, the embodiment of the disclosure is not limited to the configuration in which the tether 74 serves as the partition portions, and a configuration in which a sewn portion formed by sewing the base cloth 76, 78 serves as a partition portion may also be employed. In this case, the sewn portion is partially omitted such that the communication ports are formed.

The gas generating device 54 described above is stored in the intermediate portion in the up-down direction at the rear end portion in the rear chamber 70R, and the upper and lower stud bolts 56A of the inflator 56 penetrate through the base cloth 76 and the side wall portion 22A of the outer side frame 22 and are screwed to the nuts 60. Accordingly, the side airbag 70 is fastened and fixed to the outer side frame 22 by using the inflator 56 (the gas generating device 54). The gas generated by the inflator 56 in the rear chamber 70R is supplied to the front chamber 70F through the plurality of communication ports formed in the front-rear partition portion 74A. Accordingly, the side airbag 70 is configured to inflate and deploy toward the seat front side of the outer side portion 16A and be interposed between the seated occupant P and a vehicle body side portion (not illustrated) (for example, the door trim of the front side door and the B pillar garnish).

As illustrated in FIG. 1, the side airbag 70 is formed to inflate and deploy in the up-down direction of the seat back 16 as its longitudinal direction and restrain the chest C, the abdomen B, and the waist L of the seated occupant P from the outside in the vehicle-width direction. In the inflated and deployed state of the side airbag 70, the front-rear partition portion 74A of the tether 74 extends in the up-down direction of the seat back 16 along the front edge portion 16A1 of the outer side portion 16A and faces the center portions of the chest C and the abdomen B of the seated occupant P in the front-rear direction. The up-down partition portion 74B of the tether 74 extends from the lower end of the front-rear partition portion 74A toward the vehicle front side along the waist of the seated occupant P. Accordingly, the front chamber 70F separated from the rear chamber 70R by the front-rear partition portion 74A and the up-down partition portion 74B is configured to restrain the front portions of the chest C and the abdomen B of the seated occupant P, and the rear chamber 70R is configured to restrain the rear portions of the chest C and the abdomen B and the front portion and the rear portion of the waist L.

Supplementally, the rear chamber 70R has a chest-abdomen restraint portion 70R1 for restraining the rear portions of the chest C and the abdomen B and a waist restraint portion 70R2 for restraining the front portion and the rear portion of the waist L and is formed in a substantially L-shape in a case where the inflated and deployed state is viewed in the vehicle-width direction. The chest-abdomen restraint portion 70R1 inflates and deploys primarily within the outer side portion 16A on the vehicle rear side of the front chamber 70F and restrains portions from the upper end portion of the rear portion of the chest C to the lower end portion of the rear portion of the abdomen B. The rear portion side of the waist restraint portion 70R2 which restrains the rear portion of the waist L inflates and deploys within the outer side portion 16A, and the front portion side of the waist restraint portion 70R2 which restrains the front portion of the waist L inflates and deploys toward the vehicle front side relative to the outer side portion 16A along with the front chamber 70F. The front portion side of the waist restraint portion 70R2 is separated from the front chamber 70F by the up-down partition portion 74B and inflates and deploys toward the vehicle lower side of the front chamber 70F. The up-down partition portion 74B is inclined so as to gradually descend toward the vehicle front side in the inflated and deployed state of the side airbag 70. In addition, the lower edge portion of the rear chamber 70R is inclined so as to gradually ascend toward the vehicle front side. Accordingly, the front portion side (the portion for restraining the front portion of the waist L) of the waist restraint portion 70R2 in the state in which inflation and deployment is completed is formed such that the dimensions in the vehicle up-down direction decrease toward the vehicle front side.

Furthermore, in the embodiment, as illustrated in FIG. 1, the upper surface of the side airbag 70 in the state in which inflation and deployment is completed is configured to serve as an inclined surface 70U having a descending gradient toward the vehicle front side. Specifically, the entire upper surface of the front chamber 70F in the state in which inflation and deployment is completed and the front portion side of the upper surface of the chest-abdomen restraint portion 70R1 in the state in which inflation and deployment is completed serve as the continuous inclined surface 70U having a descending gradient toward the vehicle front side. The inclined surface 70U presses the upper arm A of the seated occupant P from the vehicle rear side when the side airbag 70 inflates and deploys. Accordingly, a configuration in which the upper arm A is pushed upward by the inclined surface 70U toward the vehicle upper side (see the upper arm A indicated by the two-dot chain line in FIG. 1) is achieved.

Figure 5:
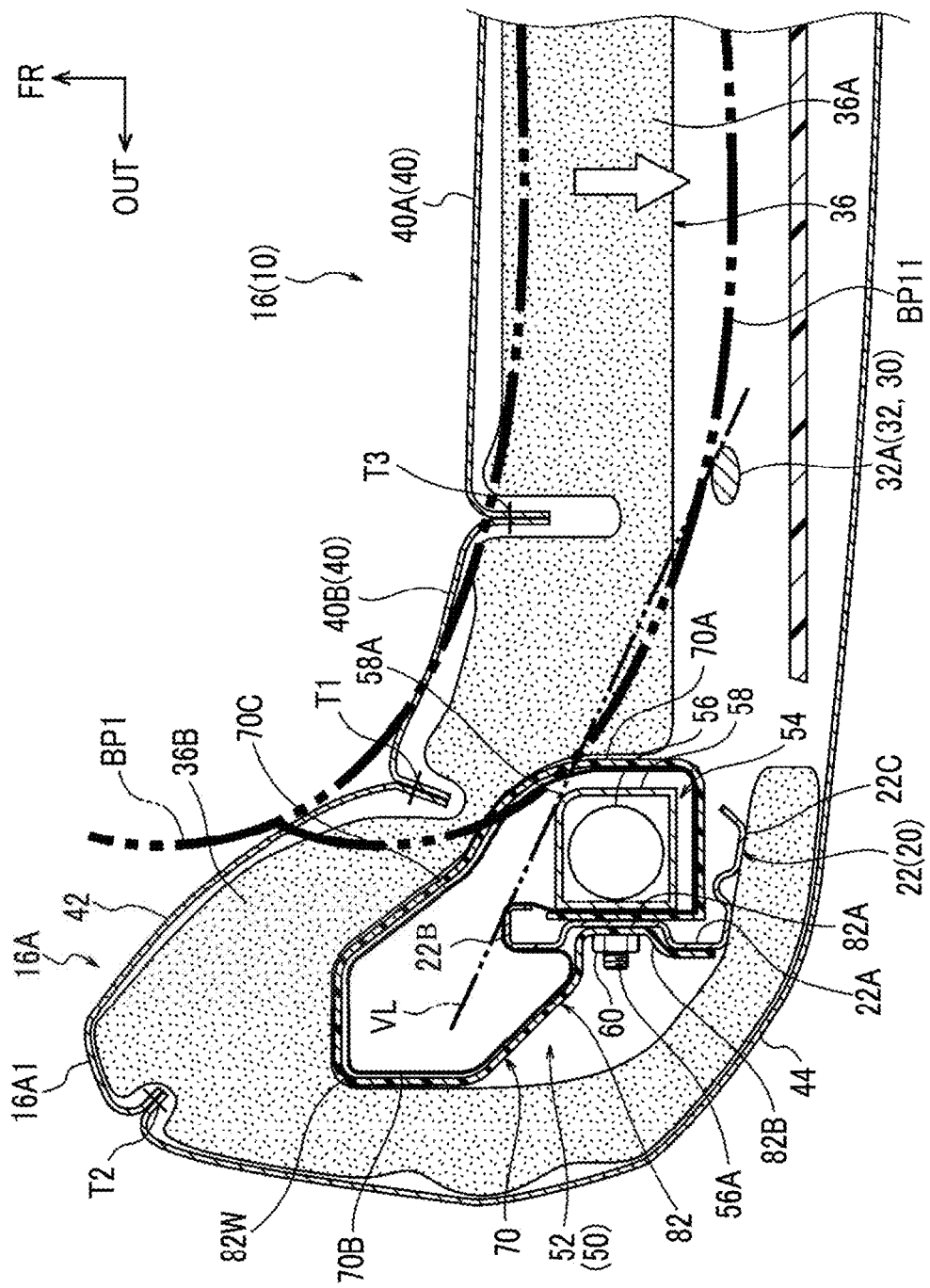
FIG. 5 is a plan sectional view corresponding to FIG. 3, and is a view illustrating a state in which an imaginary line overlapping a section of the back pan of a three-dimensional mannequin is moved back toward a seat rear side until the imaginary line comes into contact with right and left side spring portions.

As described above, the side airbag 70 having the above configuration and the gas generating device 54 normally act as the airbag module 52 illustrated in FIGS. 3 and 5 and are stored in the outer side portion 16A. In FIGS. 3 and 5, the side airbag 70 in the stored state is schematically illustrated solely by the outer shape line (outline) of the side airbag 70. The side airbag 70 in the stored state straddles the outer side frame 22 from the vehicle front side in the vehicle-width direction, and the portion including the front chamber 70F is folded on the outside of the outer side frame 22 in the vehicle-width direction.

That is, the side airbag 70 in the stored state is constituted by an inner storage portion 70A positioned on the center side of the outer side frame 22 in the vehicle-width direction together with the gas generating device 54, an outer storage portion 70B positioned outward of the outer side frame 22 in the vehicle-width direction, and a connection portion 70C which connects the inner storage portion 70A and the outer storage portion 70B on the vehicle front side of the outer side frame 22. The side airbag 70 in the stored state is mainly folded in the outer storage portion 70B. The outer storage portion 70B is folded by a folding method including any of bellows folding, roll folding, and vertical folding, or a folding method in which these are appropriately combined.

The outer storage portion 70B is disposed closer to the vehicle front side than the inner storage portion 70A and is disposed closer to the vehicle front side than the nut 60. Most of the outer storage portion 70B is positioned closer to the vehicle front side than the front flange portion 22B of the outer side frame 22. On the other hand, most of the inner storage portion 70A is positioned closer to the vehicle rear side than the front flange portion 22B. Accordingly, the airbag module 52 including the side airbag 70 in the folded state is inclined along the front side skin 42 that forms the surface of the outer side portion 16A on the seated occupant P side.

Furthermore, in the embodiment, the side airbag 70 stored in the outer side portion 16A as described above is surrounded by the enclosing member 82 (see FIG. 3, not illustrated in the other figures) in the plan sectional view of the seat back 16. The enclosing member 82 is formed of a resin or a cloth impregnated with a resin (for example, a nonwoven fabric such as felt), and is formed in a shape that surrounds the side airbag 70 in the stored state in the plan sectional view of the seat back 16. The enclosing member 82 has rigidity that can hold its own shape.

One end portion 82A of the enclosing member 82 is interposed between the retainer 58 and the side wall portion 22A on the inside of the outer side frame 22 in the seat-width direction, and the stud bolt 56A of the inflator 56 penetrates through one end portion 82A of the enclosing member 82. The other end portion 82B of the enclosing member 82 is disposed outward of the outer side frame 22 in the seat-width direction such that the stud bolt 56A of the inflator 56 penetrates through the other end portion 82B of the enclosing member 82 and is screwed to the nut 60. Accordingly, the enclosing member 82 is engaged (here, fastened and fixed to) with the outer side frame 22, and the folded state of the side airbag 70 is held by the enclosing member 82.

In the enclosing member 82, a weak portion 82W is formed in a corner section on the vehicle front side and on the outside in the vehicle-width direction. At the weak portion 82W, for example, the corner section of the enclosing member 82 is formed to be locally thin and extends in the up-down direction of the seat back 16. The weak portion 82W is configured to easily break (tear open) by the inflation pressure of the side airbag 70. As a result of the breaking, the front portion side of the enclosing member 82 is divided in the seat-width direction, and the side airbag 70 is allowed to inflate and deploy. The weak portion 82W is not limited to the corner section of the enclosing member 82 which is formed to be locally thin, and the configuration thereof can be appropriately changed. For example, a configuration in which the weak portion 82W is formed by forming a plurality of slits, holes, or the like in the corner section in the up-down direction of the seat back 16 may be employed. The material of the enclosing member 82 is not limited to the resin or the cloth impregnated with a resin, and may be a flexible sheet-like material (cloth, paper, or the like).

Here, in the vehicle seat 10 having the above-described configuration, when relative movement of the torso of the seated occupant (AM50 dummy) P which moves relative to the seat back 16 toward the seat rear side (vehicle rear side) at the time of a rear collision of the vehicle is restrained by the seat back spring 30 (when the seat back spring 30 is compressed), the gas generating device 54 is disposed rearward of the torso of the seated occupant P in the seat front-rear direction and outward of the torso of the seated occupant P in the seat-width direction.

Specifically, the above positional relationship is set by the following idea. That is, in the plan section (see FIGS. 3 and 5) of the seat back 16 in a range in which the gas generating device 54 is positioned in the seat up-down direction, in a case where an imaginary line BP1 (see FIG. 5) overlapping the section (see FIG. 3) of the back pan BP in the three-dimensional mannequin 3DM is moved back toward the seat rear side (see an imaginary line BP11 in FIG. 5) until the imaginary line BP1 comes into contact with the right and left side spring portions 32B, 32A (the side spring 32B is not illustrated in FIGS. 3 and 5), the gas generating device 54 is positioned rearward of the moved-back imaginary line BP11 in the seat front-rear direction and outward of the moved-back imaginary line BP11 in the seat-width direction. In addition, in the embodiment, as illustrated in FIG. 5, in the plan section of the seat back 16 in the range in which the gas generating device 54 is positioned in the seat up-down direction, the gas generating device 54 is positioned closer to the seat rear side than an imaginary straight line VL being in contact with the front end portion of the outer side frame 22 and the side spring portion 32A on the outside in the vehicle-width direction on the seat front side.

In addition, the imaginary line BP1 overlaps the section of the back pan BP illustrated in FIG. 3 without any deviation, and the imaginary line BP11 is drawn by directly displacing the imaginary line BP1 toward the seat rear side without displacement of the imaginary line BP1 in the seat up-down direction and the seat-width direction. In addition, in a case where the position of the gas generating device 54 is confirmed in a state in which the vehicle seat 10 is completed, for example, in the range in which the gas generating device 54 is positioned in the seat up-down direction, the seat back 16 and the back pan BP are cut in a seat horizontal direction, a model (corresponding to the imaginary line BP1) having the same shape as the cut section of the back pan BP is created, and the model is displaced as described above for the confirmation.

Operation and Effects

Next, the operation and effects of the embodiment will be described.

In the vehicle seat 10 having the above configuration, the gas generating device 54 that supplies inflation gas to the side airbag 70 is attached to the inside of the outer side frame 22 in the seat-width direction. In a case where the seated occupant P is the three-dimensional mannequin 3DM of the AM50, the gas generating device 54 is disposed such that a portion of the gas generating device 54 overlaps the back pan BP of the three-dimensional mannequin 3DM as viewed in the seat front-rear direction. That is, in a case where the seated occupant P has the same physique as the AM50, a portion of the gas generating device 54 overlaps the torso of the seated occupant P as viewed in the seat front-rear direction.

Here, in the plan section of the seat back 16 in the range in which the gas generating device 54 is positioned in the seat up-down direction, in a case where the imaginary line BP1 overlapping the section of the back pan BP is moved back toward the seat rear side until the imaginary line BP1 comes into contact with the right and left side spring portions 32B, 32A of the seat back spring 30, the gas generating device 54 is positioned rearward of the moved-back imaginary line BP11 in the seat front-rear direction and outward of the moved-back imaginary line BP11 in the seat-width direction. Accordingly, when the torso of the seated occupant P which is the AM50 dummy moves relative to the seat back 16 toward the seat rear side while compressing the seat back pad 36 at the time of a rear collision of the vehicle and the relative movement is restrained by the right and left side spring portions 32B, 32A of the seat back spring 30, the gas generating device 54 is positioned rearward of the torso of the seated occupant P in the seat front-rear direction and outward of the torso of the seated occupant P in the seat-width direction. Therefore, according to the embodiment, it is possible to prevent or suppress the torso of the seated occupant P from interfering with the gas generating device 54 in the seat front-rear direction (abutting the gas generating device 54 via the seat back skin 38 and the seat back pad 36).

Furthermore, in the embodiment, the gas generating device 54 attached to the inside of the outer side frame 22 in the seat-width direction is stored in the side airbag 70. The side airbag 70 is stored in the seat back 16 in a state in which the side airbag 70 straddles the outer side frame 22 from the seat front side in the seat-width direction and the portion of the side airbag 70 positioned outward of the outer side frame 22 in the seat-width direction is folded. That is, a portion of the side airbag 70 (the front portion side including the front chamber 70F) is folded on the outside of the outer side frame 22 in the seat-width direction. Therefore, it is possible to prevent or suppress the torso of the seated occupant P moving relative to the seat back 16 toward the seat rear side at the time of a rear collision of the vehicle from interfering with the side airbag 70 in the stored state in the seat front-rear direction. In addition, mounting of the side airbag 70 (the airbag module 52) on the seat back 16 having a narrow gap between the outer side frame 22 and the seated occupant P is facilitated.

Furthermore, in the embodiment, the retainer 58 having a rectangular tube shape included in the gas generating device 54 has the corner R set in the corner section 58A on the seat front side and on the inside in the seat-width direction (that is, on the seated occupant P side). Accordingly, compared to a case where the corner R is not set in the corner section 58A, the corner section 58A is disposed to be moved back toward the seat rear side and the outside in the seat-width direction. Therefore, it is possible to more effectively prevent or suppress the torso of the seated occupant P moving relative to the seat back 16 toward the seat rear side at the time of a rear collision of the vehicle from interfering with the retainer 58 (the gas generating device 54) in the seat front-rear direction.

In addition, in the embodiment, when the side collision ECU 62 detects a side collision of the vehicle based on the output of the side collision sensor 64, the inflator 56 attached to the center side of the outer side frame 22 in the vehicle-width direction is operated. The rear chamber 70R of the side airbag 70 having the inflator 56 stored therein is inflated and deployed earlier at a higher pressure than the front chamber 70F by the outer side frame 22 while receiving a reaction force toward the center side in the vehicle-width direction such that the seated occupant P is pressed toward the center side in the vehicle-width direction (see an arrow F in FIG. 2). Accordingly, the seated occupant P can be moved toward the center side in the vehicle-width direction at an early stage.

In the embodiment, in a case where the seated occupant P is the three-dimensional mannequin 3DM of the AM50, the outer side frame 22 is disposed such that a portion of the outer side frame 22 overlaps the back pan BP of the three-dimensional mannequin 3DM as viewed in the vehicle front-rear direction. Accordingly, the outer side frame 22 is disposed close to the seated occupant P. Furthermore, as described above, the gas generating device 54 is attached to the center side in the seat-width direction of the outer side frame 22 disposed close to the seated occupant P, and the gas generating device 54 is stored in the rear chamber 70R of the side airbag 70. Accordingly, the rear chamber 70R is allowed to inflate and deploy early at a higher pressure at a distance close to the seated occupant P, so that the time for the movement of the seated occupant P toward the center side in the vehicle-width direction by the rear chamber 70R can be effectively reduced.

Supplemental Description of Embodiment

In the embodiment, the side airbag 70 is configured to be stored in the seat back 16 in the state in which the side airbag 70 straddles the outer side frame 22 from the vehicle front side in the seat-width direction and the portion thereof positioned outward of the outer side frame 22 in the seat-width direction is folded, but the embodiment of the disclosure is not limited thereto. That is, a configuration in which the folded side airbag 70 is stored on the inside of the outer side frame 22 in the seat-width direction may be employed.

Further, in the embodiment, the gas generating device 54 is configured to be attached to the inside of the outer side frame 22 in the seat-width direction (the center side in the vehicle-width direction), but the embodiment of the disclosure is not limited thereto, and the gas generating device 54 may be configured to be attached to the inside of the inner side frame 24 in the seat-width direction (the outside in the vehicle-width direction). That is, the embodiment of the disclosure is also applicable to a vehicle seat (a vehicle seat having a so-called far-side airbag apparatus mounted therein) in which the airbag module 52 is attached to the inner side frame 24.

In the embodiment, the seat back spring 30 is configured to include the wire member 32 and the plate member 34, but the embodiment of the disclosure is not limited thereto, and the configuration of the seat back spring 30 can be appropriately changed. For example, the seat back spring 30 may be referred to as a spring mat, a flat mat, or the like, or may be formed of a resin.

In the embodiment, the front chamber 70F in the state in which inflation and deployment is completed is configured to restrain the front portions of the chest C and the abdomen B of the seated occupant P, and the rear chamber 70R in the state in which inflation and deployment is completed is configured to restrain the rear portions of the chest C and the abdomen B and the front portion and the rear portion of the waist L of the seated occupant P, but the embodiment of the disclosure is not limited thereto. The restrained points of the seated occupant P by the front chamber 70F and the rear chamber 70R, and the shapes of the front chamber 70F and the rear chamber 70R can be appropriately changed.

Furthermore, in the embodiment, the side airbag 70 is a front-rear two-chamber type, but the embodiment of the disclosure is not limited thereto, and the side airbag 70 may be a single chamber type or a three-chamber type.

Furthermore, in the embodiment, the configuration in which the gas ejecting portion 56B is provided at the upper end portion of the inflator 56 is employed, but the embodiment of the disclosure is not limited thereto, and a configuration in which the gas ejecting portion 56B is provided at the lower end portion of the inflator 56 may also be employed. In this case, the gas ejecting portion 56B is disposed near the lower end portion of the seat back frame 20 (a portion connected to a seat cushion frame (not illustrated)). Therefore, it is possible to reduce the deflection of the seat back frame 20 at the time of gas ejection from the gas ejecting portion 56B.

Besides, the embodiment of the disclosure can be implemented with various modifications without departing from the gist thereof. It is a matter of course that the scope of the disclosure is not limited to the embodiment.

What is claimed is:

1. A vehicle seat with a side airbag apparatus, comprising:
   a seat back frame including right and left side frames, an upper frame, and a lower frame;
   a seat back spring that is disposed between the right and left side frames, includes a wire member including right and left side spring portions bridged between the upper frame and the lower frame and a plate member attached to the wire member, and supports a seat back pad from a seat rear side;
   a side airbag; and
   a gas generating device that is attached to an inside of one of the right and left side frames in a seat-width direction and is configured to supply inflation gas to the side airbag, wherein:
   in response to a seated occupant being a three-dimensional mannequin of a world side impact dummy AM50, a portion of the gas generating device overlaps a back pan of the three-dimensional mannequin as viewed in a seat front-rear direction; and
   in a plan section of a seat back in a range in which the gas generating device and the right and left side frames are positioned in a seat up-down direction, an imaginary line overlapping a section of the back pan is moved back toward the seat rear side until a moved imaginary line comes into contact with the right and left side spring portions, the gas generating device and the right and left side frames are rearward of the moved imaginary line in the seat front-rear direction and outward of the moved imaginary line in the seat-width direction.

2. The vehicle seat according to claim 1, wherein:
   the gas generating device is stored in the side airbag; and
   the side airbag is stored in the seat back in a state in which the side airbag straddles the one side frame from a seat front side in the seat-width direction and a portion of the side airbag positioned outward of the one side frame in the seat-width direction is folded.

3. The vehicle seat according to claim 1, wherein the gas generating device includes a cylinder type inflator disposed such that an axial direction of the inflator is aligned with an up-down direction of the seat back, and
   a retainer that is formed in a rectangular tube shape in which an axial direction of the retainer is aligned with the up-down direction of the seat back, has the inflator inserted into the retainer, and has a corner R set in a corner section on a seat front side and on the inside in the seat-width direction.

4. The vehicle seat according to claim 3, wherein the corner R is formed in an arc shape which is convex toward the seat front side and the inside in the seat-width direction in a plan sectional view of the seat back, and is formed closer to a center side of the retainer than the other three corner sections of the retainer.

5. The vehicle seat according to claim 1, wherein each of the right and left side frames includes a side wall portion extending in a vehicle front-rear direction in a plan sectional view of the seat back,
   a front flange portion extending from a front end of the side wall portion toward the inside in the seat-width direction, and
   a rear flange portion extending from a rear end of the side wall portion toward the inside in the seat-width direction.

6. The vehicle seat according to claim 5, wherein:
   the rear flange portion has a larger dimension in the seat-width direction than a dimension of the front flange portion in the seat-width direction;
   a rib protruding inward in the seat-width direction is formed at a center portion of the side wall portion in the vehicle front-rear direction, and a rib protruding toward a seat front side is formed at a center portion of the rear flange portion in the seat-width direction, and
   the one side frame is disposed such that a portion of the rear flange portion overlaps the back pan of the three dimensional mannequin as viewed in the seat front-rear direction.

7. The vehicle seat according to claim 1, wherein a range in which the gas generating device is positioned in the seat up-down direction is a range of 150 mm to 300 mm from a hip-point.

8. The vehicle seat according to claim 1, wherein the side airbag is formed as a single bag body, and includes a tether which partitions the bag body into a front chamber and a rear chamber.

9. The vehicle seat according claim 1, wherein a center portion of the gas generating device is outward of an end portion in inner side of seat-width direction of the right and left side frames.

10. A vehicle seat with a side airbag apparatus, comprising:
a seat back frame including right and left side frames;
a seat back spring that is disposed between the right and left side frames, is supported by the seat back frame, and supports a seat back pad from a seat rear side;
a side airbag; and
a gas generating device that is attached to an inside of one of the right and left side frames in a seat-width direction and is configured to supply inflation gas to the side airbag,
wherein, in response to a seated occupant being a three dimensional mannequin of a world side impact dummy AM50, the gas generating device and the right and left side frames are separated and disposed such that a portion of the gas generating device overlaps a back pan of the three-dimensional mannequin as viewed in a seat front-rear direction, and in a plan section of a seat back in a range in which the gas generating device is positioned in a seat up-down direction, an imaginary line overlapping a section of the back pan is moved back toward the seat rear side until the imaginary line comes into contact with the seat back spring, the gas generating device is attached to be rearward of the moved-back imaginary line in the seat front-rear direction and outward of the moved-back imaginary line in the seat-width direction.

11. The vehicle seat according to claim 10, wherein:
the gas generating device is stored in the side airbag; and
the side airbag is stored in the seat back in a state in which the side airbag straddles the one side frame from a seat front side in the seat-width direction and a portion of the side airbag positioned outward of the one side frame in the seat-width direction is folded.

12. The vehicle seat according to claim 10, wherein the gas generating device includes a cylinder type inflator disposed such that an axial direction of the inflator is aligned with an up-down direction of the seat back, and
a retainer that is formed in a rectangular tube shape in which an axial direction of the retainer is aligned with the up-down direction of the seat back, has the inflator inserted into the retainer, and has a corner R set in a corner section on a seat front side and on the inside in the seat-width direction.

13. The vehicle seat according to claim 12, wherein the corner R is formed in an arc shape which is convex toward the seat front side and the inside in the seat-width direction in a plan sectional view of the seat back, and is formed closer to a center side of the retainer than the other three corner sections of the retainer.

14. The vehicle seat according to claim 10, wherein each of the right and left side frames includes a side wall portion extending in a vehicle front-rear direction in a plan sectional view of the seat back,
a front flange portion extending from a front end of the side wall portion toward the inside in the seat-width direction, and
a rear flange portion extending from a rear end of the side wall portion toward the inside in the seat-width direction.

15. The vehicle seat according to claim 14, wherein:
the rear flange portion has a larger dimension in the seat-width direction than a dimension of the front flange portion in the seat-width direction;
a rib protruding inward in the seat-width direction is formed at a center portion of the side wall portion in the vehicle front-rear direction, and a rib protruding toward a seat front side is formed at a center portion of the rear flange portion in the seat-width direction; and
the one side frame is disposed such that a portion of the rear flange portion overlaps the back pan of the three dimensional mannequin as viewed in the seat front-rear direction.

16. The vehicle seat according to claim 10, wherein a range in which the gas generating device is positioned in the seat up-down direction is a range of 150 mm to 300 mm from a hip-point.

17. A vehicle seat with a side airbag apparatus, comprising:
a seat back frame including right and left side frames, an upper frame, and a lower frame;
a seat back spring that is disposed between the right and left side frames, includes a wire member including right and left side spring portions bridged between the upper frame and the lower frame and a plate member attached to the wire member, and supports a seat back pad from a seat rear side;
a side airbag; and
a gas generating device that is attached to an inside of one of the right and left side frames in a seat-width direction and is configured to supply inflation gas to the side airbag, wherein:
in response to a seated occupant being a three-dimensional mannequin of a world side impact dummy AM50, a portion of the gas generating device overlaps a back pan of the three-dimensional mannequin as viewed in a seat front-rear direction; and
in a plan section of a seat back in a range in which the gas generating device is positioned in a seat up-down direction, in a case where an imaginary line overlapping a section of the back pan is moved back toward the seat rear side until the imaginary line comes into contact with the right and left side spring portions, the gas generating device and the side frames are positioned to be rearward of the moved-back imaginary line in the seat-width direction, and away from the moved-back imaginary line.

18. A vehicle seat with a side airbag apparatus, comprising:
a seat back frame including right and left side frames, an upper frame, and a lower frame;
a seat back spring that is disposed between the right and left side frames, includes a wire member including right and left side spring portions bridged between the upper frame and the lower frame and a plate member attached to the wire member, and supports a seat back pad from a seat rear side;
a side airbag; and a gas generating device that is attached to an inside of one of the right and left side frames in a seat-width direction and is configured to supply inflation gas to the side airbag, wherein:

in response to a seated occupant being a three-dimensional mannequin of a world side impact dummy AM50, a portion of the gas generating device overlaps a back pan of the three-dimensional mannequin as viewed in a seat front-rear direction; and in a plan section of a seat back in a range in which the gas generating device is positioned in a seat up-down direction, the gas generating device is configured to be positioned closer to a seat rear side than an imaginary straight line being in contact with a front end portion of the outer side frame and a side spring portion on the outside in a vehicle-width direction on a seat front side.

* * * * *